United States Patent [19]
Nippert et al.

[11] Patent Number: 6,047,471
[45] Date of Patent: Apr. 11, 2000

[54] METHOD OF MAKING A RESISTANCE WELDING ELECTRODE

[75] Inventors: Russell Alan Nippert, Columbus; Brian Eugene Swank, Marengo, both of Ohio

[73] Assignee: The Nippert Company, Delaware, Ohio

[*] Notice: This patent is subject to a terminal disclaimer.

[21] Appl. No.: 08/975,022

[22] Filed: Nov. 20, 1997

[51] Int. Cl.⁷ .................................................. B23K 35/02
[52] U.S. Cl. .............................. 29/882; 29/876; 29/825; 29/874; 219/119
[58] Field of Search .............................. 29/882, 881, 874, 29/876, 825; 219/119

[56] References Cited

U.S. PATENT DOCUMENTS

5,914,057  6/1999  Nippert et al. ........................... 219/119

*Primary Examiner*—Lee Young
*Assistant Examiner*—Rick Kiltae Chang
*Attorney, Agent, or Firm*—Kilworth, Gottman, Hagan & Schaeff, L.L.P.

[57] ABSTRACT

A process is provided for forming a resistance welding electrode. The process includes the step of providing a billet formed from a high conductivity metal. The billet includes a first portion having a first inner cavity formed therein. The process further includes the steps of inserting an insert into the first inner cavity of the billet, and deforming the insert so as to mechanically lock the insert in place in the billet. The deformed billet comprises the resistance welding electrode.

20 Claims, 6 Drawing Sheets

METHOD OF MAKING A RESISTANCE WELDING ELECTRODE

BACKGROUND OF THE INVENTION

The present invention relates to welding electrodes, and to a process for forming same.

Resistance welding has long been used as a quick and effective method of joining metal members. The workpieces to be welded are placed in abutting relationship and a large electrical current is caused to flow through the workpieces by a pair of opposed electrodes that contact the workpieces on opposite sides of the weld point. The current causes the abutting surfaces of the workpieces to be heated sufficiently to effect the formation of a weld nugget. Typically, the electrodes apply significant pressure to the workpieces during welding. This facilitates the welding process by urging the material together and, also, reducing electrical resistance between each electrode tip and the adjacent workpiece material that it contacts.

Since welding is accomplished by resistance heating of the material being welded, it will be appreciated that the electrodes will also be heated substantially. It is important to have electrodes of high electrical conductivity in order to minimize the power loss in the electrode, and the resulting heating of the electrode.

Over time, the repeated heating and pressing operations involved in resistance welding cause breakdown, softening, mushrooming and other deformation of the electrodes. The current density of the current going through the workpieces drops. As this occurs, electrical current requirements for welding increase with the enlarged welding tip face contacting the workpiece material until ultimately, redressing or replacement of the electrode is required. Accordingly, it is also important to have an electrode which is capable of withstanding significant distorting force at the elevated temperatures which result from the welding process so as to minimize the number of times it becomes necessary to redress or replace the electrode within a given period of time.

It is known in the art to form resistance welding electrodes by combining a copper electrode body with an anneal resistant, high hardness insert. Typically, the insert performs much better than the copper material from which the electrode body is formed. However, the insert material is much more expensive than the copper used to form the electrode body.

The insert may be brazed onto the shank of the electrode. The brazing step is disadvantageous, however, as it adds an additional step to the electrode manufacturing process and, hence, increases the cost of the electrode. Furthermore, the brazing operation may anneal and soften the electrode body.

It is also known to force the insert into an electrode body via a press-fit operation. The steel being welded today is often galvanized or coated with a zinc or other, softer metal coating. As a result, resistance welding electrode may tend to stick to the coated metal. An electrode tip joined to an electrode body only by means of a press-fit may tend to pull out of the body as the electrode is retracted following resistance welding of coated materials, thus requiring replacement of the electrode.

Accordingly, there is a need for an improved resistance welding electrode which can be manufactured via an efficient and more cost effective process and, yet, is capable of performing in an acceptable manner.

SUMMARY OF THE INVENTION

This need is met by the present invention, whereby an improved resistance welding electrode, and a process for forming the same are provided. The process involves providing a billet having an inner cavity, inserting a dispersion strengthened copper insert into the billet and deforming the insert-containing billet via cold-working operations so as to lock the insert in place mechanically in the billet. The forming operations may be performed in a single step such that the electrode can be manufactured in an efficient and cost effective manner. Furthermore, because the insert is mechanically locked in place within the billet, it is unlikely that the normal amount of sticking that occurs during resistance welding of coated steel will pull the insert out of the billet. It is also noted that the billet is preferably formed from a CDA C10700 silver bearing copper which is a high conductivity material. Previously, it was generally thought that silver bearing copper should not be used in forming welding electrodes as it was believed that such material would anneal at the temperatures involved in resistance welding. However, by virtue of cooling water located in an inner cavity of the silver bearing copper main body portion and because the main body portion makes only limited, if any, contact with a workpiece, annealing of the main body portion is prevented.

According to a first aspect of the present invention, a process for forming a resistance welding electrode is presented. A billet formed from a high conductivity metal is provided. The billet includes a first portion having a first inner cavity being defined by a first wall and a first stop face. An insert is inserted into the first inner cavity of the billet with the insert having a first portion positioned substantially adjacent the first stop face. The insert is deformed such that an outer diameter of the first portion of the insert is increased, thereby mechanically locking the insert in place in the billet.

The step of deforming the insert may comprise containing a first section of the first portion of the billet by a forming element and then applying pressure to the billet so as to displace at least the first portion of the billet not contained by the forming element and the first portion of the insert thereby increasing the outer diameter of the first portion of the insert and mechanically locking it in the billet. The step of providing a billet may comprise providing a generally cylindrical cut-off portion of high conductivity metal, upsetting and forward extruding the cut-off portion so as to form the billet having the first portion and a second portion, and forming the first inner cavity in the first portion of the billet. The process may further comprise the step of forming a second inner cavity in the second portion of the billet. The step of forming the first inner cavity in the first portion of the billet and the step of forming a second inner cavity in the second portion of the billet may be performed substantially simultaneously. Preferably, the insert is formed from an internally oxidized copper-aluminum alloy or dispersion strengthened copper. The billet may be formed from a high conductivity copper or a silver bearing copper.

According to another aspect of the present invention, a process for forming a resistance welding electrode comprises providing a generally cylindrical cut-off portion of high conductivity metal. A billet is formed from the generally cylindrical cut-off portion having a first portion with a first inner cavity therein and a second portion with a second inner cavity therein. The first inner cavity is defined by a first wall and a first stop face. An insert is inserted into the first inner cavity of the billet. The insert includes a first portion positioned substantially adjacent the first stop face. A first section of the first portion of the billet and a second portion of the insert are contained via a forming element. Pressure is applied to the billet thereby increasing an outer diameter of a second section of the first portion of the billet and an outer diameter of the first portion of the insert so as to lock the insert in place mechanically in the billet, thereby forming the resistance welding electrode.

The step of containing a first section of the first portion of the billet and a second portion of the insert via a forming element may comprise the steps of positioning the first section of the first portion of the billet and the second portion of the insert in an inner cavity of the forming element, the forming element being part of a punch assembly. The inner cavity of the forming element includes an inner diameter substantially equal to an outer diameter of the first portion of the billet. The second section of the first portion of the billet is positioned in an inner cavity of a forming die, the forming die being part of a die assembly. The inner cavity of the forming die having an inner diameter substantially equal to an outer diameter of a second section of a first portion of the electrode. The die assembly includes a forming pin located axially within the second inner cavity and extending into the second inner cavity. The forming pin has an outer diameter substantially equal to an inner diameter of the second inner cavity of the billet. The step of applying pressure to the billet may comprise the step of applying pressure to the billet via a forming punch of the punch assembly to cause the outer diameter of the second section of the first portion of the billet to increase, the outer diameter of the first portion of the insert to increase and a length of the insert to decrease. The forming punch has an outer diameter substantially equal to the outer diameter of the first portion of the billet. The step of applying pressure to the billet via a forming punch may cause forward extrusion of the first portion of the billet over the forming pin thereby increasing a length of the second inner cavity into the first portion of the billet.

According to yet another aspect of the present invention, a process for forming a resistance welding electrode comprises providing a generally cylindrical cut-off portion of high conductivity metal. The cut-off portion is upset and forward extruded so as to form a billet having a first portion and a second portion. A first inner cavity is back extruded in the first portion of the billet with the first inner cavity being defined by a first wall and a first stop face. A second inner cavity is back extruded in the second portion of the billet. An insert is inserted into the first inner cavity of the billet. The insert includes a first portion positioned substantially adjacent the first stop face. A first section of the first portion of the billet and a second portion of the insert are contained via a forming element. Pressure is applied to the billet thereby increasing an outer diameter of a second section of the first portion of the billet and an outer diameter of the first portion of the insert so as to lock the insert in place mechanically in the billet. The first portion of the billet is forward extruded thereby extending the second cavity into the first portion of the billet. The second portion of the billet is contoured such that second portion of the billet has a predetermined shape. The steps of back extruding the first inner cavity and back extruding the second inner cavity may be performed substantially simultaneously. The steps of applying pressure to the billet and forward extruding the first portion of the billet may be performed substantially simultaneously.

According to a further aspect of the present invention, a resistance welding electrode comprises a main body formed from a high conductivity metal. The main body includes a first portion having a first inner cavity being defined by a first wall and a first stop face. An insert is provided in the first inner cavity. The insert includes a first portion which is substantially adjacent the first stop face. The first portion of the insert has a diameter greater than a diameter of the first inner cavity such that the insert is mechanically locked in place in the main body. The main body includes a substantially planar surface composed of a substantially planar surface of the first portion of the main body and a substantially planar surface of the second portion of the insert.

Preferably, the diameter of a first section of the first portion of the main body is less than the diameter of a second section of the first portion of the main body. The first section of the first portion of the main body terminates at the substantially planar surface. The main body may further include a second inner cavity provided in a second portion of the main body which is adapted to be supplied with a cooling fluid during a resistance welding process. Preferably, the insert is formed from an internally oxidized copper-aluminum alloy or dispersion strengthened copper. The main body may be formed from a high conductivity copper or a silver bearing copper.

Accordingly, it is an object of the present invention to provide an improved low cost resistance welding electrode and process for forming same. It is further an object of the present invention to provide a resistance welding electrode having a dispersion strengthened copper insert which is mechanically locked in position within a main body formed from a high conductivity metal. Other features and advantages of the invention will be apparent from the following description, the accompanying drawings and the appended claims.

BRIEF DESCRIPTION OF THE DRAWINGS

FIGS. 1A–6A illustrate various manufacturing steps for manufacturing a resistance welding electrode according to the present invention;

FIGS. 1B–6B are cross-sectional views of the electrode after each of the manufacturing steps illustrated in FIGS. 1A–6A;

DETAILED DESCRIPTION OF THE PREFERRED EMBODIMENTS

Figures 1A, 1B:
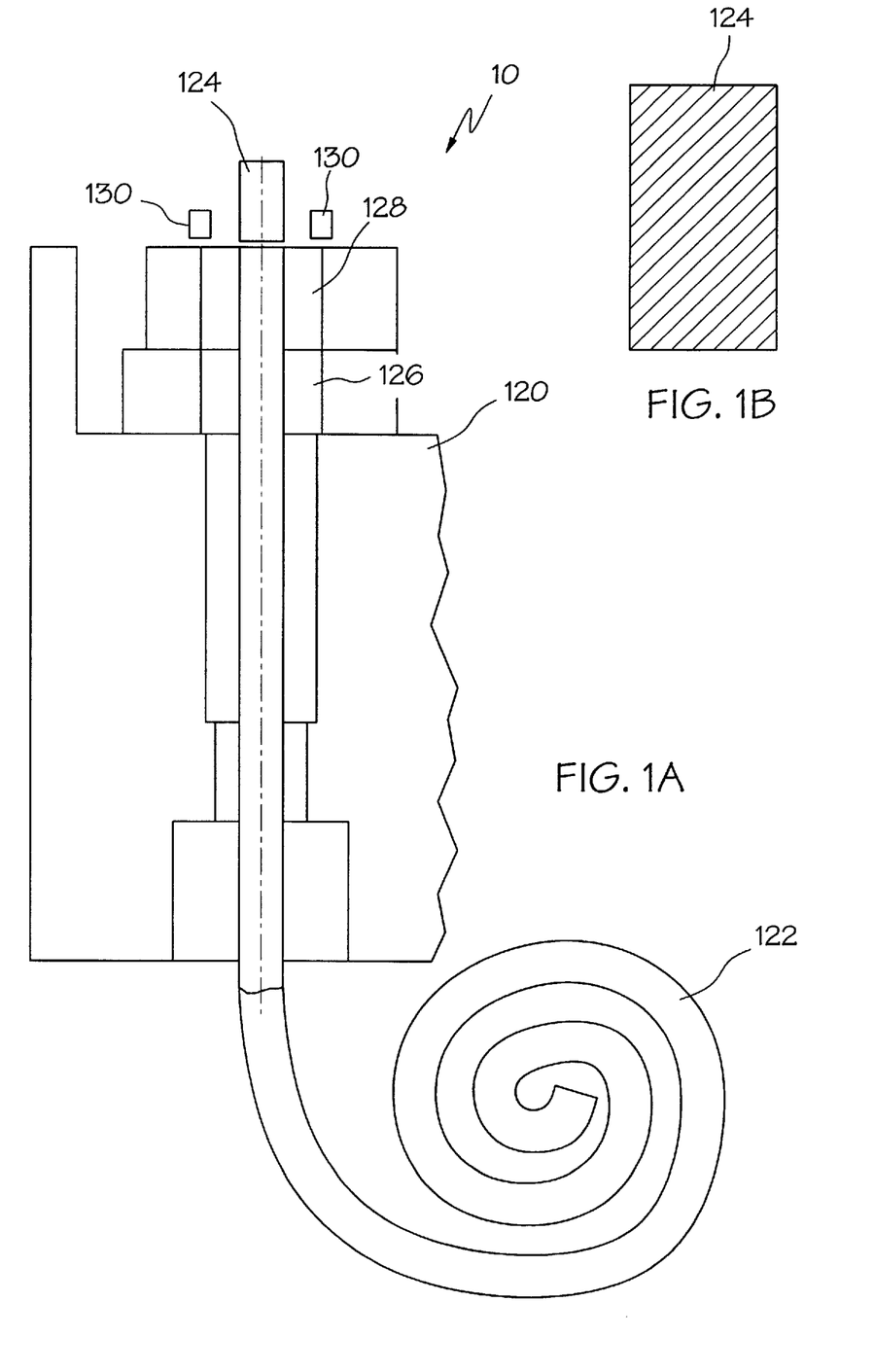
Figure 7:
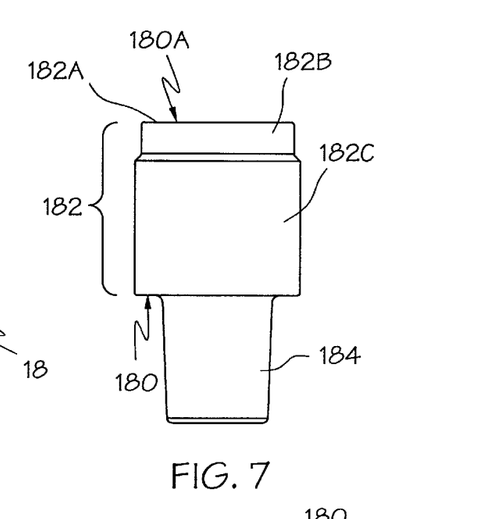
FIG. 7 is a side view of the electrode manufactured according to the present invention.
Figure 8:
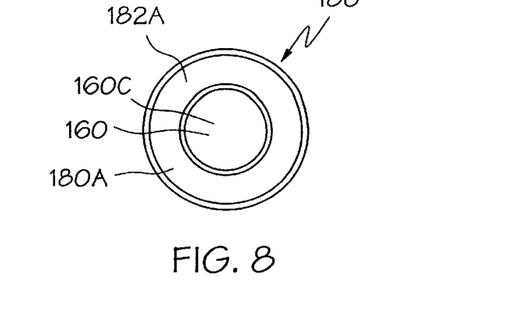
FIG. 8 is a top view of the electrode of FIG. 7.

Referring now to FIGS. 1A–6A, a press 10 is provided having a stationary bed portion 12 and a ram portion 14 which is caused to move back and forth relative to the bed portion 12 by a conventional drive apparatus (not shown). The bed and ram portions 12 and 14 include respectively first and second electrode forming tooling 16 and 18, which are provided at first, second, third, fourth and fifth forming stations 20, 40, 60, 80 and 100. Referring specifically to FIG. 1A, positioned adjacent to the first forming station 40 is a conventional cutting station 120. A roll of substantially solid wire stock 122 having a predetermined diameter is fed to the cutting station 120 where it is cut into discrete, generally cylindrical cut-off portions 124, one of which is shown in FIG. 1B. The cut-off portions 124 are used in forming resistance welding electrodes 180, one of which is shown in FIGS. 6B, 7 and 8. The wire stock 122 is fed through a quill 126 and cut to a predetermined length by a cutter 128 thereby forming the cut-off portions 124. Conventional work transfer fingers 130 (shown schematically in the drawings) move each of the discrete cut-off portions 124 from the cutting station 120 to the first forming station 20 and from the first forming station 20 through the remaining forming stations 40, 60, 80 and 100.

Figure 2A:
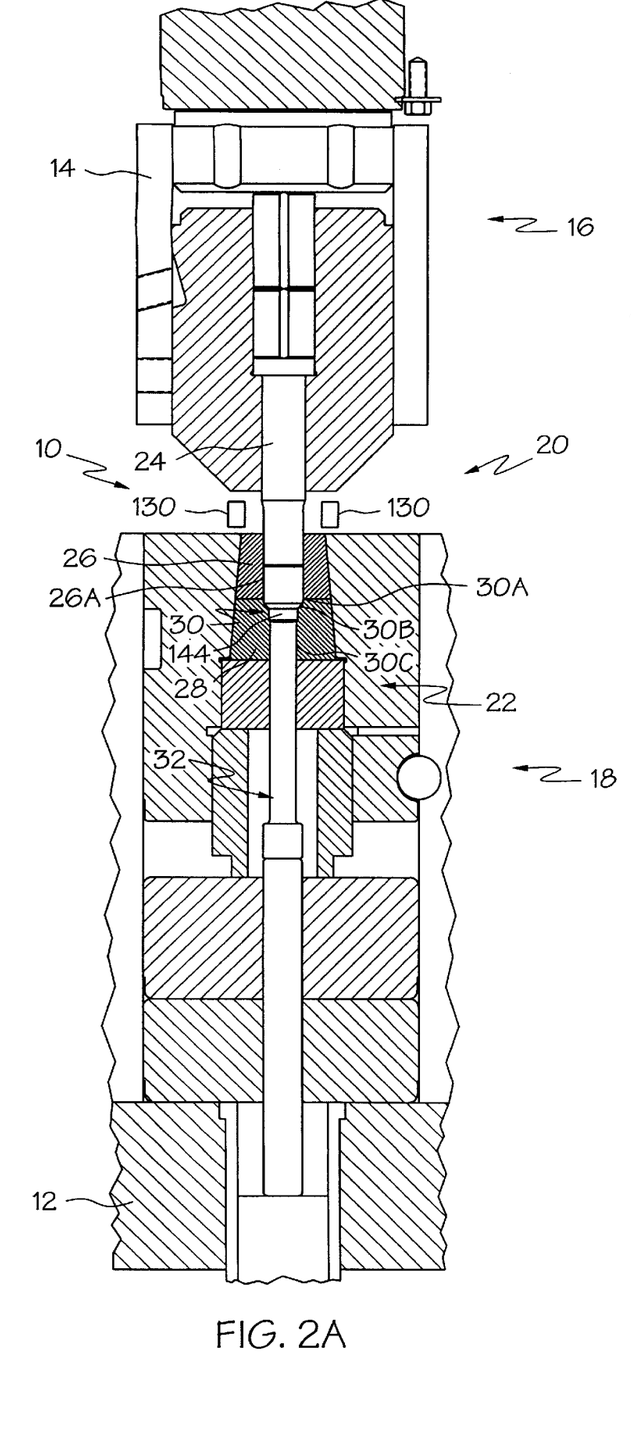
Figure 2B:
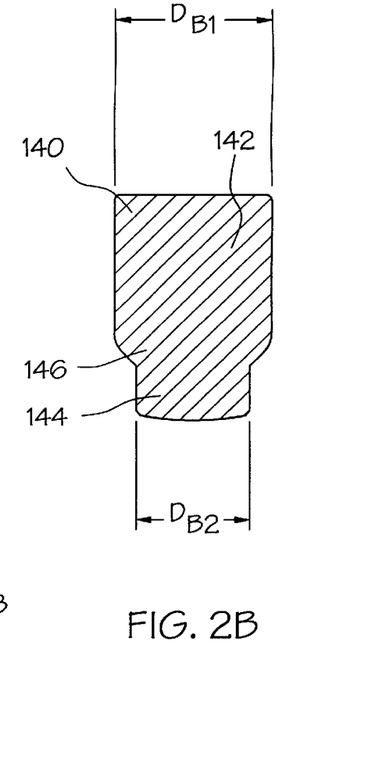

Referring now to FIG. 2A, the cut-off portion 124 is then transferred to the first forming station 20 where the cut-off portion 124 is transformed into a billet 140 shown in FIG. 2B. The billet 140 includes a nose or first portion 142 having a first outer diameter $D_{B1}$, a stem or second portion 144 having a second outer diameter $D_{B2}$ and an intermediate tapered portion 146. The first forming station 20 includes a first forming die assembly 22 and a first forming punch 24. The first die assembly 22 includes a first forming die 26 and a second forming die 28 which are fixedly coupled to the bed portion 12 and, hence, are stationary. The first die 26 includes a first inner cavity 26A having an inner diameter substantially equal to the first outer diameter $D_{B1}$. The second die 28 includes a second inner cavity 30 having a first section 30A having an inner diameter substantially equal to the first outer diameter $D_{B1}$, a second section 30B having a tapered diameter corresponding to the tapered portion 146, and a third section 30C having an inner diameter substantially equal to the second outer diameter $D_{B2}$.

The first punch 24 is fixedly coupled to and moves with the ram portion 14. The first punch 24 has an outer diameter substantially equal to the first outer diameter $D_{B1}$. As the ram portion 14 is driven towards the bed portion 12, the first punch 24 engages the cut-off portion 124 held adjacent to the first die 26 via the pair of the work transfer fingers 130 and inserts the cut-off portion 124 into the first inner cavity 26A of the first die 26 and into the first section 30A of the second inner cavity 30 of the second die 28. The first punch 24 then applies sufficient pressure to the cut-off portion 124 to effect forward extrusion and upsetting of the cut-off portion 124 such that the billet 140 is formed. The cut-off portion 124 is upset since the first diameter $D_{B1}$ of the first portion of the billet 140 is greater than the diameter of the cut-off portion 124. The cut-off portion 124 is forward extruded as the cut-off portion 124 is forced through the third section 30A which has an inner diameter less than the diameter of the cut-off portion 124. The first die assembly 22 includes an ejection pin 32 which ejects the billet 140 from the first and second dies 26, 28 and into the work transfer fingers 130 after the cut-off portion 124 has been forward extruded and upset.

Figure 3A:
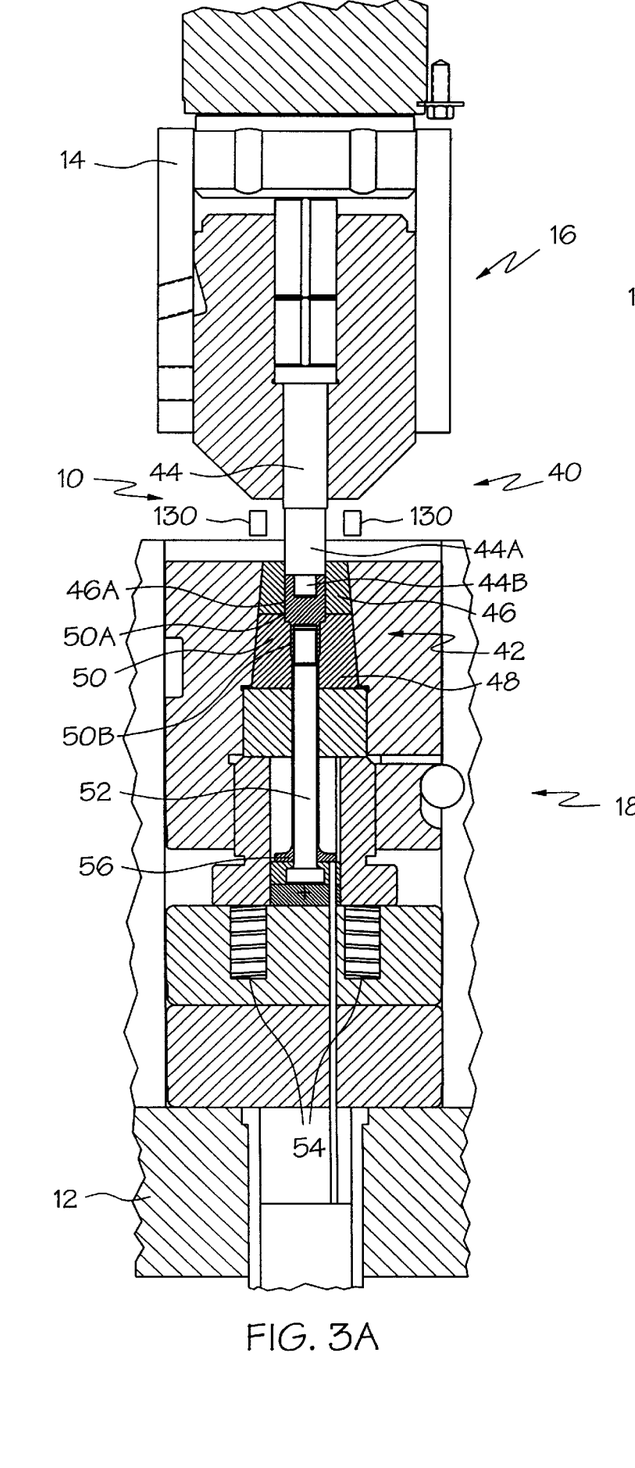

The billet 140 is then transferred to the second forming station 40 shown in FIG. 3A. The second forming station 40 includes a second forming die assembly 42 and a second forming punch 44. The second die assembly 42 includes a third forming die 46 and a fourth forming die 48 which are slidably coupled to the bed portion 12. The third die 46 includes a third inner cavity 46A having an inner diameter substantially equal to the first diameter $D_{B1}$. The fourth die 48 includes a fourth inner cavity 50 having a first section 50A having an inner diameter substantially equal to the first diameter $D_{B1}$ and a second section 50B having an inner diameter substantially to the second diameter $D_{B2}$. The second die assembly 42 includes a forming pin 52 which is fixedly coupled to the bed portion 12 and extends into the fourth inner cavity 50. The forming pin 52 has an outer diameter substantially equal to an inner diameter of a second inner cavity 148 in the second portion 144 of the billet 140, see FIG. 3B. The third and fourth dies 46, 48 slide about the forming pin 52 and are biased towards the ram portion 14 via a pair of springs 54.

The second punch 44 is fixedly coupled to the ram portion 14 and moves with the same. The second punch 44 includes a first portion 44A having an outer diameter substantially equal to the first diameter $D_{B1}$ and a second portion 44B having an outer diameter substantially equal to an inner diameter of a first inner cavity 150 in the first portion 142 of the billet 140, see FIG. 3B. The first inner cavity 150 is defined by a first wall 150A and a first stop face 150B. As the ram portion 14 is driven towards the bed portion 12, the second punch 44 engages the billet 140 held adjacent to the third die 46 via the pair of the work transfer fingers 130 and inserts the billet 140 into the second die assembly 40. The second portion 144 of the billet 140 is contained in the second section 50B of the fourth inner cavity 50 of the fourth die 48 while the first portion of the billet 140 is contained in the third inner cavity 46A of the third die 46. The intermediate portion 146 of the billet 140 is positioned within the first section 50A of the fourth inner cavity 50 of the fourth die 50. The second punch 44 applies sufficient pressure to the first portion 142 of the billet 140 so as to form the first inner cavity 150 through back extrusion. The second punch 44 continues to apply sufficient pressure against the billet 140 thereby causing the third and fourth dies 46 to slide towards and around the forming pin 52. The second inner cavity 148 is thus formed through back extrusion as the second portion 148 of the billet 140 is driven over the forming pin 52.

Figure 3B:
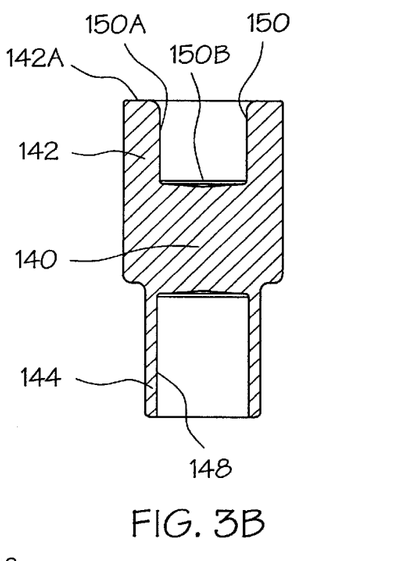

In the illustrated embodiment, the first inner cavity 150 is smaller than the second inner cavity 148 such that the amount of force required to form the first inner cavity 150 is less than the amount of force required to form the second inner cavity 148. Accordingly, the first inner cavity 150 may be formed prior to sliding the third and fourth dies 46, 48 for formation of the second inner cavity 148. As the first and second inner cavities 150, 148 are formed, the lengths of the first and second portions 142, 144 increase as the extruded material is displayed around the second portion 46A of the second punch 46 and the forming pin 52. Further, the intermediate portion 146 is displaced into the first portion 142 of the billet 140. The second die assembly 42 further includes an ejection sleeve 56 positioned about the forming pin 52 and is movable relative to the pin 52. The ejection sleeve 56 ejects the billet 140 from the dies 46 and 48 and into the work transfer fingers 130 after the first and second cavities 150, 148 have been formed.

Figures 4A, 4B:
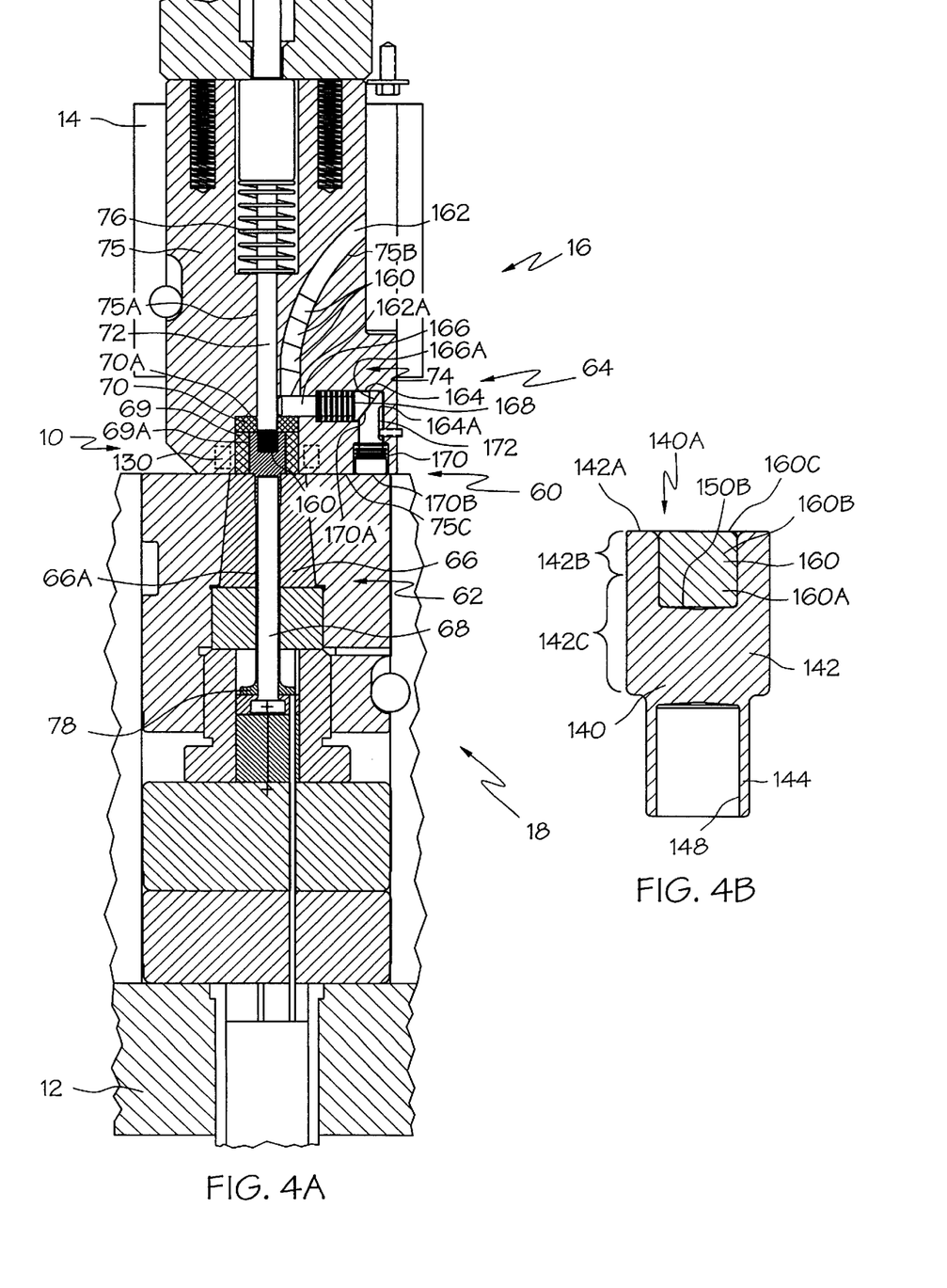

The billet 140 is then transferred to the third forming station 60 shown in FIG. 4A. The third forming station 60 includes a third forming die assembly 62 and a third forming punch assembly 64. The third die assembly 62 includes a fifth forming die 66 and a pressure pin 68 which are fixedly coupled to the bed 12 and, hence, are stationary. The fifth die 66 includes a fifth inner cavity 66A having a inner diameter substantially equal to second outer diameter $D_{B2}$ of the second portion 144 of the billet 140. The pressure pin 68 has an outer diameter substantially equal to the inner diameter of the second inner cavity 148.

The third punch assembly 64 includes a first support element 69, a second support element 70, a third punch 72 and an insert supply mechanism 74. The first support element 69 includes an inner cavity 69A having a inner diameter substantially equal to the first outer diameter $D_{B1}$ of the first portion 142 of the billet 140. The second support element 70 includes an inner cavity 70A having a inner diameter substantially equal to the inner diameter of the first inner cavity 150. The first and second support elements 69, 70 are slidably coupled to the ram portion 104 through a support block 75. The third punch 72 has an outer diameter substantially equal to the inner diameter of the first inner cavity 150. The third punch 72 is slidably coupled to the ram portion 14. The third punch 72 slides through an inner cavity 75A of the support block 75 as the support block 75 engages the third die assembly 62. The third punch 72 is biased towards the bed portion 12 via a spring 76. The insert supply mechanism 74 supplies dispersion strengthened copper inserts 160 one at a time into the path of movement of the third punch 72 such that the third punch 72 inserts a copper insert 160 into the first inner cavity 150 of the billet 140 as shown in FIG. 4B. The insert supply mechanism 74 comprises a supply conduit 162 having a plurality of inserts 160 therein. The inserts 160 are fed to the conduit 162 via a feed device (not shown). The conduit 162 extends through a bore 75B in the support block 75 and is fixedly connected to the support block 75 so as to move with the same. A distal end 162A of the conduit 162 terminates at an insert receiving channel 164 in the support block 75 such that the conduit 162 supplies inserts 160 to the channel 164.

The supply mechanism 74 further includes a reciprocating pin 166 which extends into the channel 164. A spring 168 biases the pin 166 toward an outer surface 164A of the channel 164 away from the conduit 162. The supply mechanism 74 includes a plunger 170 positioned in a plunger channel 172 within the support block 75 and connected to the channel 164. The plunger 170 includes a beveled surface 170A which engages a corresponding beveled surface 166A on the pin 166. The spring 168 biases the pin 166 toward the plunger 170 such that the beveled surface 166A engages the beveled surface 170A on the plunger 170 forcing the plunger 170 up from the plunger channel 172. The plunger 170 includes a surface 170B which extends above an upper surface 75C of the support block 75 when the punch assembly 64 is in a first position separated from the die assembly 62. Upon upward movement of the punch assembly 64, the plunger 170 moves downward, engaging the pin 166 through the interaction of the beveled surfaces 166A, 170A such that the pin 166 is moved inward against the force of the spring 168. As the pin 166 moves inward, it pushes an insert 160 located in the channel 164 in a direction toward the path of movement of the pin 72. FIG. 4A shows the punch assembly 64 in a second position with the pin 166 extending through the channel 164 covering the conduit 162. Upon separation of the punch assembly 64 from the die assembly 62, the plunger 172 is pushed upwards from the plunger channel 172 as the spring 168 pushes against the pin 166. Once the pin 166 extends away from the conduit 162, another insert 160 is forced into the channel 164.

As the ram portion 14 moves toward the bed portion 12, the punch assembly 64 engages the billet 140 held adjacent to the fifth die 66 via the pair of the work transfer fingers 130. The second portion 144 is pushed into fifth die 66 with the second inner cavity 148 being supported by the pressure pin 68. The billet 140 is pushed into the inner cavity 69A of the first support element 69. The surface 170B of the plunger 170 engages die assembly 62 pushing the pin 166 inward such that an insert 160 is pushed into the inner cavity 75A of the support block 75. With the insert 160 in the inner cavity 75A, the support block 75 slides about the pin 72 with the insert 160 being pushed into the first inner cavity 150 of the first portion 142 of the billet 140. The spring 76 provides sufficient force so as to press fit the insert 160 into the first inner cavity 150. The insert 160 includes a first portion 160A which is positioned substantially adjacent to the first stop face 150B of the first cavity 150. The billet 140 includes a substantially planar surface 140A comprised of a substantially planar surface 142A of the first portion 142 of the billet 140 and a substantially planar surface 160C of a second portion 160B of the insert 160. The first portion 142 of the billet 140 includes a first section 142B extending from the planar surface 142A to a first end of the first portion 160A of the insert 160 and a second section 142C extending from the first end of the first portion 160A of the insert 160 to the second portion 144 of the billet 140.

The third die assembly 62 further includes an ejection sleeve 78 positioned about the pressure pin 68 and is movable relative to the pin 68. The ejection sleeve 78 in conjunction with the pin 72 ejects the billet 140 from the die 66 and support element 69, respectively, and into the work transfer fingers 130 after the insert 160 is positioned in the billet 140. As the punch assembly 64 is removed from the die assembly 62, the pin 72 is extended further in a direction toward the die assembly 62 so as to eject the billet 140 from the punch assembly 64.

Figures 5A, 5B:
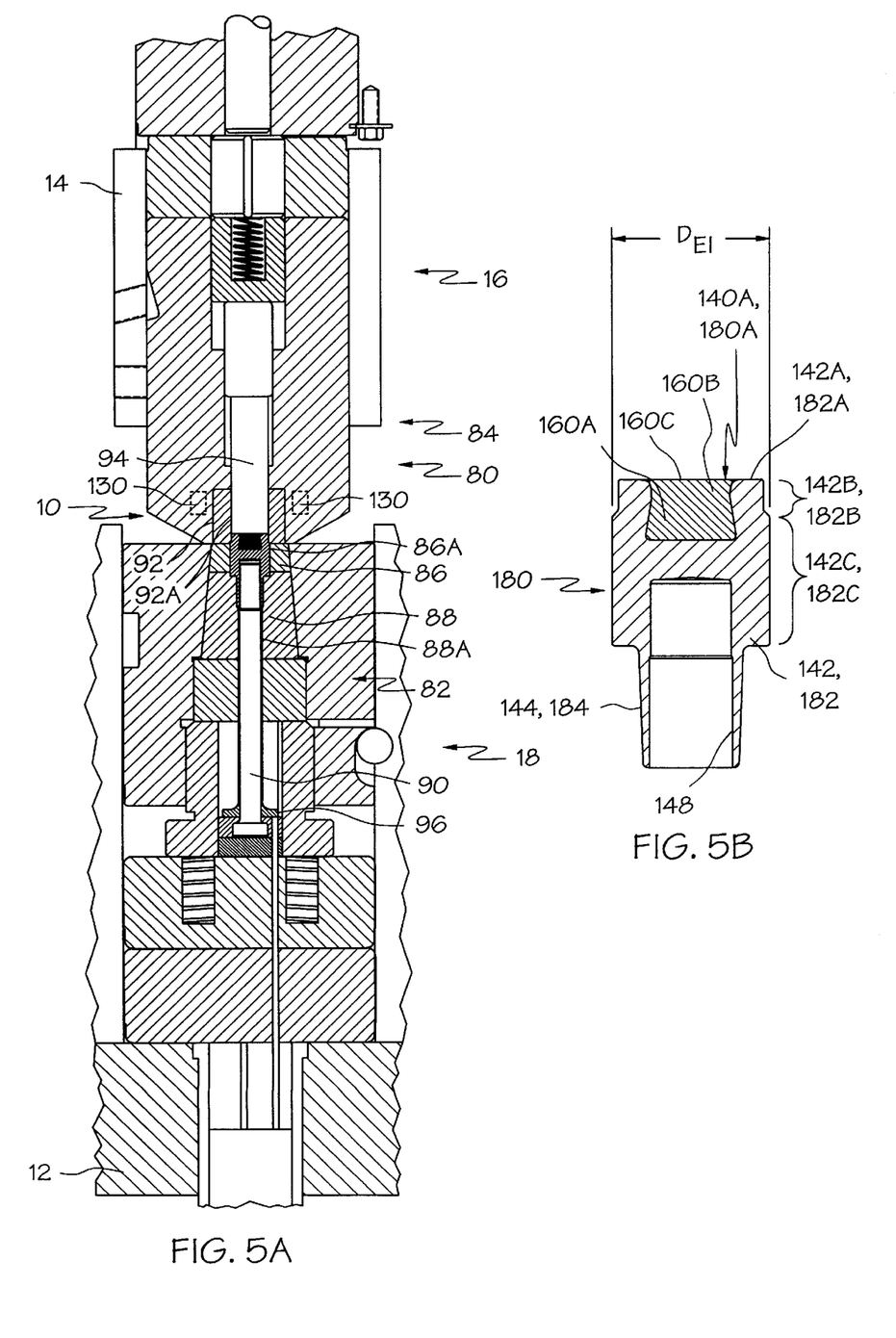

From the third forming station 60, the billet 140 is moved to the fourth forming station 80 where it is deformed so as to lock the insert 160 in place mechanically and form a resistance welding electrode 180, one of which is shown in FIG. 5B. The electrode 180 includes a nose or first portion 182 and a stem or second portion 184 which correspond to the first and second portions 142, 144 of the billet 140, respectively. Further, the first portion 182 of the electrode 180 includes a first section 182B and a second section 182C which correspond to the first and second sections 142B, 142C of the first portion 142 of the billet 140. The first portion 182 of the electrode 180 also includes a substantially planar surface 182A which corresponds to the substantially planar surface 142A of the first portion 142 of the billet 140. The electrode 180 includes a substantially planar surface 180A corresponding to the substantially planar surface 140A of the billet 140. The billet 140 is also referred to herein as the main body of the electrode 180.

The fourth forming station 80 comprises a fourth forming die assembly 82 and a fourth forming punch assembly 84. The fourth die assembly 82 includes a sixth die 86, a seventh die 88 and an extrusion pin 90. The sixth die 86 includes a seventh inner cavity 86A having an inner diameter substantially equal to an outer diameter $D_{E1}$ of the second section 182B of the first portion 182 of the electrode 180. The seventh die 88 includes a seventh inner cavity 88A having an inner diameter substantially equal to the outer diameter of the second portion 144 of the billet 140. The extrusion pin 90 has an outer diameter substantially equal to the inner diameter of the second inner cavity 148. The extrusion pin 90 is fixedly coupled to the bed portion 12 and extends through the inner cavity 88A. The sixth and seventh dies 86, 88 are slidably coupled to the bed portion 12 and slide about the extrusion pin 90.

The fourth punch assembly 84 includes a forming element 92 and a forming punch 94 which are fixedly coupled to the ram portion 14 and move with the same. The forming element 92 includes an inner cavity 92A having an inner diameter substantially equal to the outer diameter of the first portion 142 of the billet 140, and specifically, substantially equal to the outer diameter of the first section 142B of the first portion 142 of the billet 140. The punch 94 has an outer diameter substantially equal to the outer diameter of the first section 142B of the first portion 142 of the billet 140. As the ram portion 14 moves toward the bed portion 12, the punch assembly 84 engages the billet 140 held adjacent to the sixth die 86 via the pair of the work transfer fingers 130. The second portion 144 of the billet 140 is pushed through the sixth die 86 until it engages the seventh die 88. The first section 142B of the first portion 142 of the billet 140 is contained within the forming element 92.

The ram portion 14 continues to move towards the bed portion 12 with the second portion 144 of the billet supported by the seventh die 88 and the extrusion punch 90. The first section 142B of the first portion 142 of the billet 140 as well as the second portion 160B of the insert 160 are contained and supported by the forming element 92 and the punch 94. The punch 94 is driven with an appropriate amount of force to cause the sixth and seventh dies 86, 88 to slide about the extrusion pin 90, thereby displacing material from the second section 142C of the first portion 142 of the billet 140 and the first portion 162A of the insert 162 outwards. The outer diameter of the second section 142C and the outer diameter of the first portion 162A of the insert 162 increase, thereby mechanically locking the insert 162 into the billet 140. The length of the insert 160 also decreases in the process. In other words, the displacement of material causes the first portion 160A of the insert 160 to swell outward and to compress longitudinally, thereby locking it into place as the outer diameter of the first portion 160A is greater than the outer diameter of the second portion 160B. Further, the second cavity 144 is forward extruded into the first portion 142 of the billet 140. With the billet 140 deformed and the insert 160 locked in place, the billet 140 becomes the electrode 180.

The fourth die assembly 82 further includes an ejection sleeve 96 positioned about the extrusion pin 90 and is movable relative to the pin 90. The ejection sleeve 96 in conjunction with the punch 94 ejects the electrode 180 from the die 86 and the forming element 92, respectively, and into the work transfer fingers 130 after the insert 160 is mechanically locked in the billet 140. As the punch assembly 84 is removed from the die assembly 82, the punch 94 is extended further in a direction toward the die assembly 82 so as to eject the electrode 180 from the punch assembly 84.

Figure 6A:
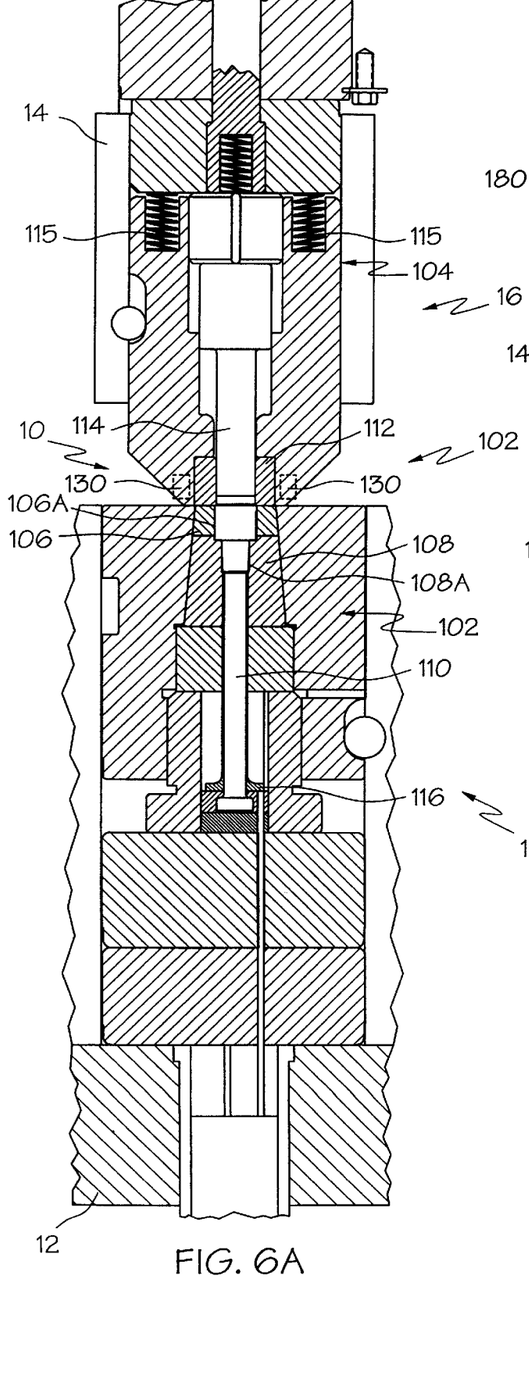

The electrode 180 is then transferred to the fifth forming station 100 shown in FIG. 6A. The fifth forming station 100 includes a fifth forming die assembly 102 and a fifth forming punch assembly 104. The fifth forming die assembly 102 includes a eighth die 106, a ninth die 108 and a pressure pin 110. The eighth die 106 and the ninth die 108 are slidably coupled to the bed portion 12 and slide about the pressure pin 110 which is fixedly coupled to the bed portion 12. The eighth die 106 includes an eighth inner cavity 106A having an inner diameter substantially equal to the outer diameter $D_{E1}$ of the electrode 180. The ninth die 108 includes a ninth inner cavity 108A having a tapered cross-section. The pin 110 has an outer diameter substantially equal to the inner diameter of the second portion 184 of the electrode 180.

Figure 6B:
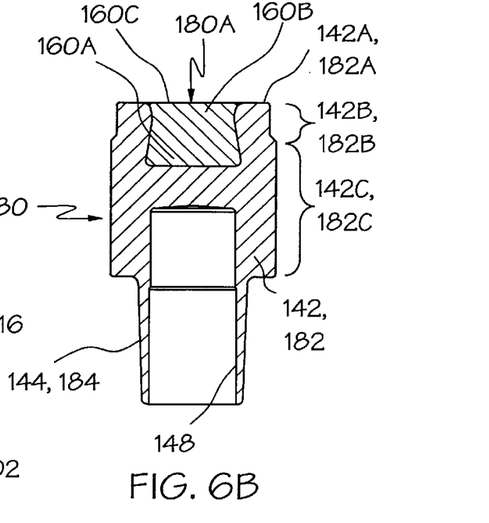

The fifth punch assembly 104 includes a forming element 112 and a forming punch 114. The forming element 112 is slidably coupled to the ram portion 14. The forming element 112 slides about the forming punch 114 and is biased towards the bed portion 12 via springs 115. The forming element 112 includes an inner cavity 112A having an inner diameter substantially equal to the outer diameter of the first section 184B of the first portion 182 of the electrode 180. The punch 114 has an outer diameter substantially equal to the outer diameter of the first section 182B of the first portion 182 of the electrode 180. As the ram portion 14 moves toward the bed portion 12, the punch assembly 114 engages the electrode 180 held adjacent to the eighth die 106 via the pair of work transfer fingers 130. The second portion 184 of the electrode 180 is pushed through the eighth die 106 until it engages the ninth die 108. The first section 182B of the first portion 182 of the electrode 180 is contained within the forming element 112. The ram portion 14 and the punch 114 continue to drive the electrode 180 using an appropriate amount of force into the ninth die 108 to contour or coin the second portion 184 of the electrode 180 into the desired shape as defined by the tapered cross-section of the ninth die 108 and as shown in FIGS. 6B and 7. The sliding action of the fifth die and punch assemblies 102, 104 ensure that the electrode 180 is properly coined.

The fifth die assembly 102 further includes an ejection sleeve 116 positioned about the pin 110 and is movable relative to the pin 110. The ejection sleeve 116 in conjunction with the punch 114 ejects the electrode 180 from the die 106 and the forming element 112, respectively, and into the work transfer fingers 130 after the second portion 184 is coined. As the punch assembly 104 is removed from the die assembly 102, the punch 114 is extended further in a direction toward the die assembly 102 so as to eject the electrode 180 from the punch assembly 104. Once the second portion 184 is coined, the electrode 180 has the desired configuration as shown in FIGS. 7 and 8.

Preferably, the copper wire 122 comprises a CDA C10700 silver bearing copper or a CDA C10500 silver bearing copper. Alternatively, another metal which is highly electrically conductive and which is substantially resistant to annealing below approximately 900° F. may be used. The inserts 160 are preferably formed from a dispersion strengthened copper such as GlidCop® Al-25 or GlidCop® Al-60, which are commercially available from OMG America's, Inc. Dispersion strengthened copper is resistant to heading or "mushrooming" during welding cycles and, further, is resists sticking to galvanized and coated steels. In the illustrated embodiment, the insert 160 is formed of an internally oxidized copper-aluminum alloy. Of course, insert 160 may be formed from other appropriate materials or resistance welding alloys which are resistant to sticking and mushrooming.

The tapered second portion 184 is adapted to fit onto the arm of a conventional robotic welder. The electrode 180 is adapted to be water cooled through the second cavity 148. The first or nose portion 182 of the electrode 180 is adapted to engage a workpiece during a resistance welding operation.

During the cold-working operations performed in stations 60, 80 and 100, the insert 160 is maintained in a compressive state. This is important since dispersion strengthened copper is relatively brittle and may break if it is placed in tension.

It is further contemplated that the electrode 180 may be machined after it has been formed in the press 10.

Having described the invention in detail and by reference to preferred embodiments thereof, it will be apparent that modifications and variations are possible without departing from the scope of the invention defined in the appended claims.

What is claimed is:

1. A process for forming a resistance welding electrode, comprising the steps of:

providing a billet formed from a high conductivity metal, said billet including a first portion having a first inner cavity, said first inner cavity being defined by a first wall and a first stop face;

inserting an insert into said first inner cavity of said billet, said insert having a first portion positioned substantially adjacent said first stop face; and deforming said insert such that an outer diameter of said first portion of said insert is increased thereby mechanically locking said insert in place in said billet.

2. The process of claim 1, wherein said step of deforming said insert comprises the steps of:

containing a first section of said first portion of said billet by a forming element;

applying pressure to said billet so as to displace at least said first portion of said billet not contained by said forming element and said first portion of said insert thereby increasing said outer diameter of said first portion of said insert and mechanically locking said first portion of said insert in said billet.

3. The process of claim 1, wherein said step of providing a billet comprises the steps of:

providing a generally cylindrical cut-off portion of high conductivity metal;

upsetting and forward extruding said cut-off portion so as to form said billet having said first portion and a second portion; and forming said first inner cavity in said first portion of said billet.

4. The process of claim 3, further comprising the step of forming a second inner cavity in said second portion of said billet.

5. The process of claim 4, wherein said step of forming said first inner cavity in said first portion of said billet and said step of forming a second inner cavity in said second portion of said billet are performed substantially simultaneously.

6. The process of claim 1, wherein said insert is formed from an internally oxidized copper-aluminum alloy.

7. The process of claim 1, wherein said insert is formed of dispersion strengthened copper.

8. The process of claim 1, wherein said billet is formed from a high conductivity copper.

9. The process of claim 1, wherein said billet is formed from a silver bearing copper.

10. A process for forming a resistance welding electrode, comprising the steps of:

providing a generally cylindrical cut-off portion of high conductivity metal;

forming a billet from said generally cut-off portion having a first portion with a first inner cavity therein and a second portion with a second inner cavity therein, said first inner cavity being defined by a first wall and a first stop face;

inserting an insert into said first inner cavity of said billet, said insert having a first portion positioned substantially adjacent said first stop face;

containing a first section of said first portion of said billet and a second portion of said insert via a forming element; and applying pressure to said billet thereby increasing an outer diameter of a second section of said first portion of said billet and an outer diameter of said first portion of said insert so as to lock said insert in place mechanically in said billet, thereby forming said resistance welding electrode.

11. The process of claim 10, wherein said step of containing a first section of said first portion of said billet and a second portion of said insert via a forming element comprises the steps of:

positioning said first section of said first portion of said billet and said second portion of said insert in an inner cavity of said forming element, said forming element being part of a punch assembly, said inner cavity of said forming element having an inner diameter substantially equal to an outer diameter of said first portion of said billet; and positioning said second section of said first portion of said billet in an inner cavity of a forming die, said forming die being part of a die assembly, said inner cavity of said forming die having an inner diameter substantially equal to an outer diameter of a second section of a first portion of said electrode, said die assembly including a forming pin located axially within said second inner cavity and extending into said second inner cavity, said forming pin having an outer diameter substantially equal to an inner diameter of said second inner cavity of said billet.

12. The process of claim 11, wherein said step of applying pressure to said billet comprises the step of:

applying pressure to said billet via a forming punch of said punch assembly to cause said outer diameter of said second section of said first portion of said billet to increase, said outer diameter of said first portion of said insert to increase and a length of said insert to decrease, said forming punch having an outer diameter substantially equal to said outer diameter of said first portion of said billet.

13. The process of claim 12, wherein said step of applying pressure to said billet via a forming punch causes forward extrusion of said first portion of said billet over said forming pin thereby increasing a length of said second inner cavity into said first portion of said billet.

14. The process of claim 10, wherein said insert is formed from an internally oxidized copper-aluminum alloy.

15. The process of claim 10, wherein said insert is formed of dispersion strengthened copper.

16. A process for forming a resistance welding electrode, comprising the steps of:

providing a generally cylindrical cut-off portion of high conductivity metal;

upsetting and forward extruding said cut-off portion so as to form a billet having a first portion and a second portion;

back extruding a first inner cavity in said first portion of said billet, said first inner cavity being defined by a first wall and a first stop face;

back extruding a second inner cavity in said second portion of said billet;

inserting an insert into said first inner cavity of said billet, said insert having a first portion positioned substantially adjacent said first stop face;

containing a first section of said first portion of said billet and a second portion of said insert via a forming element;

applying pressure to said billet thereby increasing an outer diameter of a second section of said first portion of said billet and an outer diameter of said first portion of said insert so as to lock said insert in place mechanically in said billet;

forward extruding said first portion of said billet thereby extending said second cavity into said first portion of said billet; and contouring said second portion of said billet such that second portion of said billet has a predetermined shape.

17. The process of claim 16, wherein said steps of back extruding said first inner cavity and back extruding said second inner cavity are performed substantially simultaneously.

18. The process of claim 16, wherein said steps of applying pressure to said billet and forward extruding said first portion of said billet are performed substantially simultaneously.

19. The process of claim 16, wherein said insert is formed from an internally oxidized copper-aluminum alloy.

20. The process of claim 16, wherein said insert is formed of dispersion strengthened copper.

* * * * *